Jan. 10, 1967 S. HERMAN 3,298,015
AUTOMATIC DATA PLOTTER
Filed Dec. 26, 1963 6 Sheets-Sheet 1

R = RED
Y = YELLOW
G = GREEN
B = BLUE

FIG. 3.

INVENTOR.
STEPHEN HERMAN
BY
OSTROLENK, FABER, GERB & SOFFEN
ATTORNEYS

Jan. 10, 1967  S. HERMAN  3,298,015
AUTOMATIC DATA PLOTTER
Filed Dec. 26, 1963  6 Sheets-Sheet 2

INVENTOR.
STEPHEN HERMAN
BY
OSTROLENK, FABER, GERB & SOFFEN
ATTORNEYS

INVENTORS
STEPHEN HERMAN
By Ostrolenk, Faber, Gerb & Soffen
ATTORNEYS

INVENTOR.
STEPHEN HERMAN
BY
OSTROLENK, FABER, GERB & SOFFEN
ATTORNEYS

INVENTOR.
STEPHEN HERMAN
BY
OSTROLENK, FABER, GERB & SOFFEN
ATTORNEYS

FIG. 12

UPPER SENSOR CHANGE ONLY: (LOWER RED)

| UPPER SENSOR WAS | UPPER SENSOR IS | +X/2 | -X/2 | +Y/2 | -Y/2 |
|---|---|---|---|---|---|
| RED | GREEN | | | +Y/2 | |
| | BLUE | +X/2 | | +Y/2 | |
| | YELLOW | +X/2 | | | |
| GREEN | RED | | | | -Y/2 |
| | BLUE | +X/2 | | | |
| | YELLOW | +X/2 | | | -Y/2 |
| BLUE | GREEN | | -X/2 | | |
| | RED | | -X/2 | | -Y/2 |
| | YELLOW | | | | -Y/2 |
| YELLOW | GREEN | | -X/2 | +Y/2 | |
| | BLUE | | | +Y/2 | |
| | RED | | -X/2 | | |

TABLE 1A

LOWER SENSOR CHANGE ONLY: (UPPER RED)

| LOWER SENSOR WAS | LOWER SENSOR IS | +X/2 | -X/2 | +Y/2 | -Y/2 |
|---|---|---|---|---|---|
| RED | GREEN | | | | -Y/2 |
| | BLUE | | -X/2 | | -Y/2 |
| | YELLOW | | -X/2 | | |
| GREEN | RED | | | +Y/2 | |
| | BLUE | | -X/2 | | |
| | YELLOW | | -X/2 | +Y/2 | |
| BLUE | GREEN | +X/2 | | | |
| | RED | +X/2 | | +Y/2 | |
| | YELLOW | | | +Y/2 | |
| YELLOW | GREEN | +X/2 | | | -Y/2 |
| | BLUE | | | | -Y/2 |
| | RED | +X/2 | | | |

TABLE 1B

INVENTOR
STEPHEN HERMAN
BY
OSTROLENK, FABER, GERB & SOFFEN
ATTORNEYS

United States Patent Office 3,298,015
Patented Jan. 10, 1967

3,298,015
AUTOMATIC DATA PLOTTER
Stephen Herman, Queens, N.Y., assignor to Kollsman Instrument Corporation, Elmhurst, N.Y., a corporation of New York
Filed Dec. 26, 1963, Ser. No. 333,327
26 Claims. (Cl. 340—347)

This invention relates to data plotters and more particularly to data plotting means having the capability of encoding points of a curve into its digital coordinates simultaneously with the plotting of the curve, which digital information is immediately available for digital computations and other functions as soon as it is generated.

In a wide variety of applications, systems, et cetera, it is frequently necessary to generate either magnetically, or electronically, a continuous plot or curve representing the relationship or equation between two or more variables. The manual operation consists primarily of setting up the coordinates along the $x$ and $y$ axis of suitable plotting paper; plotting the points and then connecting these points to form a continuous curve. Automatic systems are normally performed by electronic servo means, such as, for example, the well known "differential analyzer," which is an analog servo device providing a continuous curve which represents the relationship between input and output data.

In addition to continuous curves, it is also frequently necessary to provide such output information in digital form for processing by computers or other digital devices.

The instant invention provides a novel plotting means which permits plotting of such a curve and simultaneously therewith has the capability of generating digital data representing the coordinates of the curve at any given point with the selected points being as many or as few as desired, depending only upon the needs of the user.

The instant invention is comprised of a plotting board having a plurality of horizontal and vertical lines enscribed on the board, forming a regular rectangular matrix. A suitable light source is provided beneath the surface of the plotting boards so as to provide illumination through the lines forming the regular matrix. The pattern provides the appearance of lines of light crossing to form a plurality of squares in much the same manner as graph paper. A plotting instrument, or pen, is provided with a plurality of light sensing means for detecting the illuminated lines in order to identify both vertical and horizontal motion of the pen across the plotting board. The sensing means are comprised of a first plurality of vertical motion sensing means and a second plurality of horizontal motion sensing means. Each of the sensing means is comprised of a light sensitive narrow elongated strip with the vertical motion sensing means being oriented with their lengths parallel to the horizontal direction and with the horizontal motion sensing means having their lengths parallel to the vertical direction.

As a vertical motion sensor passes over a horizontal line, the light passing through its slit will be high relative to the light passing through the same slit as it passes over a vertical illuminated line of the plotting board matrix. Thus, the vertical motion sensor is able to clearly differentiate between horizontal and vertical line crossings providing a peak output for crossing a horizontal line of the plotting board matrix. In a like manner, the horizontal motion sensor differentiates between horizontal and vertical line crossings by providing a peak output when crossing a vertical line of the plotting board matrix.

Having decomposed all plotting motion into its absolute $x$ and $y$, or horizontal and vertical motion components, the task remains of defining the motion as being in the positive or negative direction along each motion component. This task is handled by providing a group of three such elongated light sensitive strips for each direction sensing means, each of said strips having its independent light detecting means. Logical circuitry is provided for determining from the pattern of light detection from the vertical and horizontal sensing means the occurrence of horizontal and vertical motion, and further, the direction of such motion, whether positive or negative.

The plotting pen is positioned above the surface of the plotting board and is substantially perpendicular thereto and is further held in this position by means of a pantograph assembly which acts to maintain the perpendicular alignment between the plotting pen and the surface of the plotting board, as well as maintaining the angular alignment between the illuminated lines of the plotting board matrix and the vertical and horizontal motion sensors housed within the plotting pen.

A predetermined location on the plotting board, identified as the starting point of the plot, is utilized to identify the coordinates of the plot traced upon the plotting board. Any suitable tracing paper may be placed upon the surface of the plotting board with the only requirement for such paper being that is readily passes the light from the illuminated slit therethrough.

The plotting pen is moved to the starting position to begin the generation of the plot. Then a reset button is pushed for the purpose of resetting the $x$ and $y$ coordinate counting means provided to the zero condition. The plotting pen may now be moved in either the horizontal, vertical, or diagonal direction, with the curve being traced upon the tracing paper provided on the surface of the plotting board. The light sensitive motion detectors automatically trigger the logical circuitry so as to generate a count in the $x$ and $y$ coordinate counting means as the plotting pen traces the curve across the surface of the plotting board. The condition of the $x$ and $y$ coordinate counters automatically changes as the horizontal and vertical motion detecting means passes across the illuminated lines forming the plotting board matrix. The coordinates of any particular point along the continuous curve are continuously available in the $x$ and $y$ coordinate counters and may be read out at any given instant simply by depressing a readout button. This operation does not destroy the count in the counters, but simply reads out the desired $x$ and $y$ coordinates to any suitable buffer means, such as paper tape, punch cards, magnetic tape, magnetic drums and other similar read devices. As many, or as few readouts as required may be taken, depending only upon the needs of the user.

Whereas the plotting board apparatus has been described for manual operation, it is also possible to provide suitable servo means mechanically linked to the plotting board pen for the purpose of moving the plotting pen across the surface of the board. The readout of the $x$ and $y$ coordinates may likewise be automated by taking five readings per second, ten readings per second, and so forth, wherein the number of readings desired depend only upon the needs of the user.

A typical plotting board may, for example, have a plotting surface of 30" x 30" with the horizontal and vertical lines of the matrix being faced 5 mils apart to provide a resolution of one part in 6000. This arrangement gives better than twelve binary bits of digital information for each coordinate, as compared with one part in 1000 for existing plotters.

Another alternative embodiment of the instant invention employs a plotting board comprised of a matrix substantially similar to the embodiment described above wherein the horizontal and vertical lines of the plotting board matrix define a plurality of substantially equal sized squares. The alternate squares of alternate rows of said matrix are formed of translucent material of a first color. The remaining squares of said alternate rows are formed of a translucent material of a second color. Alternate squares of the remaining rows are formed of a translucent material of a third color, while the remaining squares of said remaining rows are formed of a translucent material of a fourth color. The plotting board surface is illuminated by a suitable light source with the light passing therethrough being broken into the colors defined by the translucent squares of the plotting board surface.

The plotting pen, or instrument, of this alternative embodiment is provided with first and second lens systems each of which directs the light impinging on the lens through the lens and upon a beam splitting prism which splits the light beam into four directions spaced at 90° intervals about the prism. Four light sensitive means are provided, each being in the path of one of the split beams and each being responsive to a different one of the four aforementioned colors. Suitable electronic circuitry receives the output signals of the light sensitive means for the purpose of generating an $x$ and $y$ coordinate count representative of the location of the plotting pen on the surface of the plotting board at any given instant.

Since the electronic circuitry must be able to distinguish between left-right, up-down and all diagonal motions of the pen assembly in order to determine whether the coordinates should be increasing or decreasing at any given time, this is the reason for the employment of first and second light sensitive assemblies which are arranged such that a straight line drawn between their locations is oriented diagonally relative to the matrix lines of the plotting board. If, for example, the plotting pen is moved horizontally and to the right, each detector senses a color change from the first color to the second color, then back to the first color and so forth, with the counting of such squares being employed to update the $x$ coordinate counter. Similarly, if movement is limited to the vertical direction, the $y$ coordinate counter operates in a substantially similar manner by aligning the first and second light sensing assemblies in the diagonal manner and positioning them substantially one-half square apart horizontally and vertically. The relative phase of the outputs of the two sensing assemblies establishes whether the motion is horizontal, vertical, or a combination of these and whether the motion is horizontally to the left or right and vertically up or down. The electronic circuitry is arranged so as to interpret the color detection signals of the first and second light sensing assemblies to operate the $x$ and $y$ coordinate counter means so as to count squares either additatively, or subtractively, depending upon the manner of occurrence of the color sensing signals.

The plotting instrument in the instant embodiment is similarly held in position by means of a pantograph assembly and the arrangement is provided with suitable control buttons to provide off-on operations, reset operations for the resetting of the coordinate counters prior to the institution of a new plotting operation, and readout control so as to read out as often as is desired the $x$ and $y$ coordinates at any given instant of time. A preselected starting point is readily defined on the plotting board surface, at which position the plotting instrument is located in order to supply suitable referencing for the coordinate counts generated during each plot. Also, a suitable translucent tracing paper may be inserted on the surface of the plotting board for the purpose of providing the desired trace.

The instant invention may be employed for the purpose of providing digitized data representative of the $x$ and $y$ coordinates of any sort of curve or trace desired and thereby has utility in digitizing analog data, detecting and calibrating motion, such as for example, in industrial control applications, character recognition operations and a variety of other applications. The plotting instrument readily lends itself to either manual or automatic movement as by a suitable servo system and the resolution of the system is extremely high with the plotting board surface being capable in accordance with present photographic and other like methods of spacing matrix lines of the plotting board less than five mills apart.

It is therefore one object of the instant invention to provide a novel data plotting system for automatically converting analog data into digital form.

Another object of the instant invention is to provide a novel data plotting system which simultaneously provides an analog plot and digital coordinates of the analog plot at any given instant of time.

Still another object of the instant invention is to provide a novel data plotting system comprised of a substantially opaque plotting surface having a matrix of illuminated horizontal and vertical lines, for the purpose of identifying the coordinates of the plotting board at any given instant.

Another object of the instant invention is to provide a novel data plotting system comprised of a matrix of equally spaced and illuminated horizontal and vertical lines arranged upon an opaque surface and having suitable light detection means designed to generate electronic signals indicative of the detection means passing over illuminated lines for the purpose of generating a digital output representative of the $x$ and $y$ coordinates of the plotting instrument at any given instant of time.

Still another object of the instant invention is to provide a novel data plotting system comprised of a plotting instrument having first and second light detection means for generating electronic signals representative of the vertical and horizontal components of movement of the plotting instrument.

Still another object of the instant invention is to provide a novel data plotting system having logical circuitry for interpreting the signals of the data plotter light sensitive means to generate digital data representative of the $x$ and $y$ coordinates of the plotting instrument at any given instant, regardless of whether the motion of the plotting instrument be vertical, horizontal, or any diagonal direction.

Still another object of the instant invention is to provide a novel data plotting system comprised of a plotting board arranged in a checker board fashion wherein the squares of the plotting board surface are comprised of four differently colored translucent materials arranged in a predetermined fashion for the purpose of generating light of different colors to represent the coordinates of the plotting board surface.

Another object of the instant invention is to provide a novel data plotting system having a plotting instrument comprised of first and second light detection means each of which is arranged to detect the presence of any one of the four colors or wavelengths of light for the purpose of generating digital information representative of the $x$ and $y$ coordinates of the plotting instrument at any given instant.

These and other objects of the instant invention will become readily apparent when reading the accompanying description and drawings in which:

Figures 1, 1A:
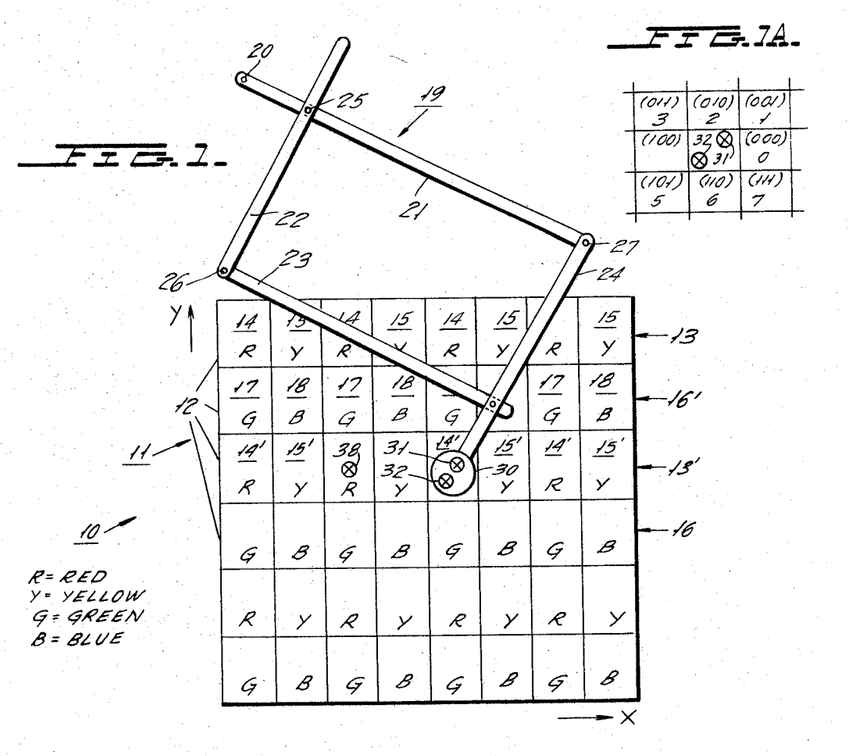
FIGURE 1 shows a plotting board designed in accordance with the principles of the instant invention.
FIGURE 1a shows an alternative embodiment of the plotting board of FIGURE 1.

Referring now to the drawings, FIGURE 1 shows a plotting board arrangement 10 having a plotting board surface 11 arranged in a checkerboard fashion and having a plurality of substantially equal sized squares 12 each formed of a translucent material capable of passing light therethrough. Alternate rows 13 of the plotting board surface 11 have alternate squares 14 formed of a translucent material which is red in color. A suitable light source (not shown) is provided beneath the plotting board surface 11 so that any light rays passing through squares 14 generates red light or red wavelength light through the squares 14. The remaining blocks 15 of alternate rows 13 are formed of a translucent material which is yellow in color to generate yellow light. The alternate squares 17 of remaining rows 16 are formed of a translucent material which is green in color while the remaining squares 18 of the remaining rows 16 are formed of a translucent material which is blue in color. It should be understood, however, that any other colors may be substituted.

The plotting board is further provided with a pantograph assembly 19 made up of the arms 21–24 wherein arms 21 and 22 are linked at pivot point 25; 22 and 23 are linked at pivot point 26; 21 and 24 are linked at pivot point 27 and 23 and 24 are linked at pivot point 28. The extension of arm 21 is pivotally connected at 20 to the plotting board surface while the extended portion of arm 24 has the plotting instrument or pen 30 secured thereto. Plotting instrument 30 is provided with first and second colored light detection assemblies represented in FIGURE 1 by the circles provided with cross hairs designated by the numerals 31 and 32. These light detection means are spaced so that an imaginary line between them lies diagonal to the horizontal (or vertical) direction of the plotting board surface and so that they are one-half square apart, both horizontally and vertically. The pantograph assembly 19 to which the plotting instrument 30 is secured is provided to maintain the angular orientation of the colored light sensing means relative to the plotting board surface, as well as maintaining the plotting pen 30 in a position so that its longitudinal axis is substantially perpendicular to the plotting board surface.

Figure 2:
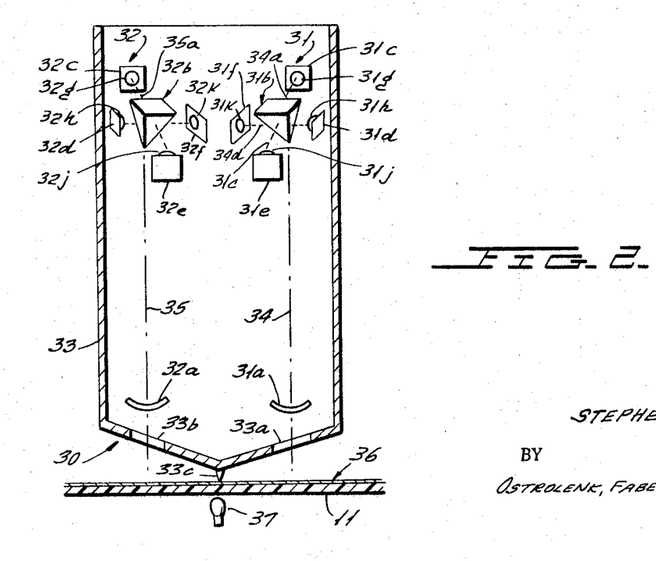
FIGURE 2 shows a plotting instrument designed for use with the plotting board of FIGURE 1.

FIGURE 2 shows the plotting pen 30 having a housing 33 which has been broken away for the purpose of observing the colored light sensing assemblies 31 and 32 housed therein. The colored light sensing assembly 31 is comprised of a lens system 31a which focuses light rays 34 emanating from the surface 11 of the plotting board, upon the underside of a beam splitting prism 31b which may for example, be a machined aluminum square pyramid which acts to break or split the light beam 34 into four separate beams 34a–34d respectively, which beams impinge respectively upon the surfaces of four light detectors 31c–31f. Each of the four light detectors are respectively provided with suitable light filters 31g–31j positioned between the light detector and the beam splitting prism 31b so that each of the detectors 31c–31f reacts to only one of the four colors of the checkerboard or square pattern of the plotting board 11. The colored light detection assembly 32 which is sensitive to the light beam 35 has its components designated with alphabetic like numerals to that of the colored light detection assembly 31 and functions in substantially the same manner. The housing 33 is provided with suitable openings 33a and 33b to permit the passage of the light rays 34 and 35 respectively.

As an alternative arrangement the plotting pen of FIGURE 2 may be provided with two optical fiber image ducts transmitting the image to an optical system located away from the point where the pen would be gripped. This leads to a much handier pen assembly than the one shown in FIGURE 2.

The multi-colored plotting board 11 may be formed by first drawing the checkerboard pattern at any convenient sizes and then photographing the pattern. A negative can then be used to produce transparencies with any degree of required box fineness (resolution) within photographic and microscope resolving power. The combined resolving power is orders of magnitude better than the 30-mil resolution system spoken of in conjunction with present day plotters. It has been found that a photoetching technique is the preferred manner for preparing multi-colored plotting boards of the desired resolution. A suitable tracing paper 36 may be placed upon the surface 11 of the plotting board assembly enabling the plotting to be done right upon the paper 36 which has a requirement only that it be suitable to permit the passage of light therethrough. The plotting board surface is illuminated from below by a suitable light source 37 and is shaded from above in any well known manner to minimize noise problems due to stray incident light. The plotting pen housing 33 is provided with a suitable point 33c which may be employed for forming the trace on the tracing paper 36, and also for locating the plotting pen 33 at the starting point 38 on the plotting surface, as shown in FIGURE 1 for the purpose of beginning the plotting operation, in a manner to be more fully described.

Figure 3:
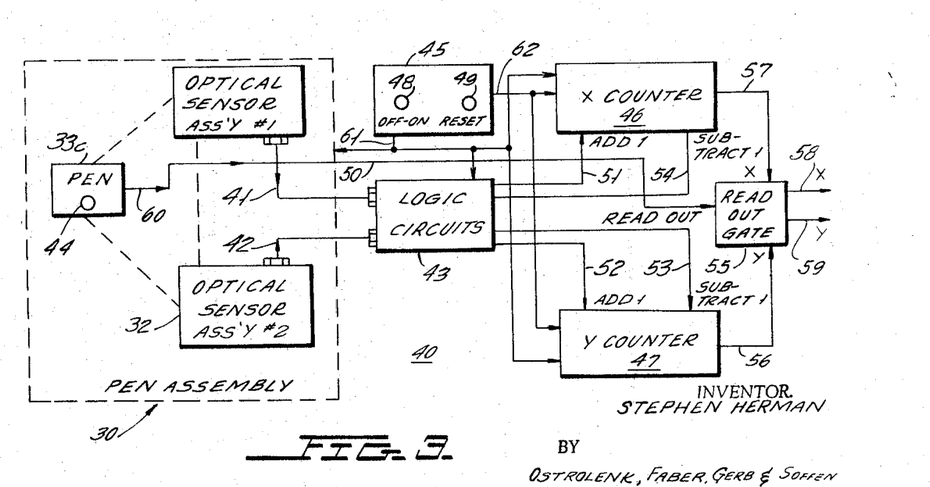
FIGURE 3 is a block diagram of the electronic circuitry employed with the plotting board and plotting instrument of FIGURES 1 and 2 respectively.

FIGURE 3 is a block diagram showing the electronic hardware 40 of the data plotting system. The plotting instrument 30 is shown diagrammatically by the block formed of dash lines which contains the scribing member 33c and the optical sensing assemblies 31 and 32. The four output lines of each optical sensing assembly 41 and and 42 are fed to the input of the logic circuits 43. The logic circuitry 43 is provided with first and second outputs 51 and 54 which are impressed upon the $x$ coordinate counter 46 for the purpose of either adding to or subtracting from the count contained therein. The readings of the $x$ and $y$ coordinate counters are made available at the outputs 57 and 56 respectively, which are impressed through suitable readout gate circuitry 55, which gating circuitry is unblocked by means of a readout button 44 provided on the pen assembly which is connected by lead 60 to the input of the readout gate circuitry 55 to pass the digital information in the counters 46 and 47 through to the output terminals 58 and 59 respectively, of the readout gate circuitry 55. A control means 45 is provided having an off-on control button 48 for supplying power through lead 61 to all circuits of the system. A reset button 49 is provided, which when depressed causes the $x$ and $y$ coordinate counters 46 and 47 through the lead 62 to be reset to zero. The counters 46 and 47 are any suitable reversible counters designed to add to or subtract from the count contained therein at any given instant. Each counter 46 and 47 is provided with a sufficient number of stages equal to the squares provided on the plotting surface in the $x$ and $y$ directions respectively. The control button may be replaced with an automatic means for continuously sampling coordinates in a periodic manner.

The operation of the data plotting system is as follows:

The power is first turned on by depressing the on-off button 48 of FIGURE 3. This energizes all electronic components for the system, as well as the light source 37 provided beneath the plotting board surface (see FIGURE 2). The plotting instrument 33 is then moved to the starting position 38. The starting position may be located at any desirable position on the surface of the plotting board 11, depending only upon the needs of the user. Fresh tracing paper 36 (see FIGURE 2) is then placed upon the surface of the plotting board. The starting position 38 may be a slight depression or hole upon the surface of the plotting board and it is necessary only that the plotting instrument point 33c be placed immediately above this hole. It is clear that since the system counts boxes, or squares, reference to a starting point, the starting point is now precisely defined. It should be understood that the choice of a positioning technique, as well as the location, is not critical and any suitable method may be employed.

The reset button 49 is then depressed so as to reset the x and y coordinate counters 46 and 47 so as to begin the operation with a zero or no count in both the counters. The plotting pen 33 may now be freely moved to any desired location along the plotting surface. The optical sensing assemblies 31 and 32 when passing over the colored squares of the plotting surface send electrical impulses to the logic circuits which interpret these impulses in order to correctly command the x and y coordinate counters 46 and 47 to either add or subtract from the counts contained therein. Whenever a location readout is desired, the readout button 44 is depressed and the counts stored in the x and y counters 46 and 47 at that given instant are made available at the output terminals 58 and 59. The operation of the data plotting means in generating the digital representations of the x and y coordinate locations can best be understood from a consideration of FIGURE 1 and the detailed logic circuitry of FIGURES 4a–4c. A step by step analysis of each possible move associated with the sensor is listed and tabulated. The logic diagram portrayed will perform all the necessary requirements of this device.

With the existing proposed system consisting of a multicolored matrix using a four color basic pattern and the two-element sensor, the number of moves requires very sophisticated logic implementation.

A brief compilation of the various moves possible with the resulting associated counter change required will be listed in detail.

Assume the sensor 30 to be comprised of two separate and distinct sensors 31 and 32 separated such that both of them can be enclosed within the confines of one of the matrix squares 13 or 16 (5 mils square) and positioned in a prescribed manner. The upper sensor 31 (so called because it is directed toward the top of FIGURE 1) will exist in the upper right hand corner of the square while the lower sensor 32 exists diagonally to the left and down from the upper sensor but still within the confines of the same square. Both sensors are rigidly positioned with respect to one another and affixed to the same mounting fixture 30 so that both move together as a unit at all times. The assembly is so designed that no rotation of the diagonal with respect to the X and Y axis of the matrix is possible. This diagonal is made by drawing an imaginary line from the center of the upper unit to that of the lower unit. With this restriction imposed, the positioned relationship of sensor 31 (upper sensor) to sensor 32 (lower sensor) is always constant.

It will be assumed that both sensors have to cross a particular horizontal line to generate a full unit change in the Y direction or both must cross a particular vertical line to generate a corresponding change in the X direction.

If only one of the two sensors crosses a line, this shall be construed as a change of only one half of a unit.

For example, it is possible to move the sensor combination in such a manner as to leave the lower sensor in the red box 14′ and still move the upper sensor in either the green 17, blue 18 or yellow 15′ box and in fact cross over these three boxes many times without moving the lower sensor out of the red box. All of these various possibilities have to be provided for.

Normally, only one sensor at a time will cross a boundary. This can be detected and will be referred to as "lower sensor change only" or "upper sensor change only." However, under certain conditions (diagonal motion up and to the left or down and to the right) both sensors may change state simultaneously. When this occurs, the effect will be to generate both pulses at the same time.

For purposes of explanation, both sensors will be assumed to start from a red box 14′ (that is both sensors contained within the red square 14′ as the initial condition).

Figure 9:
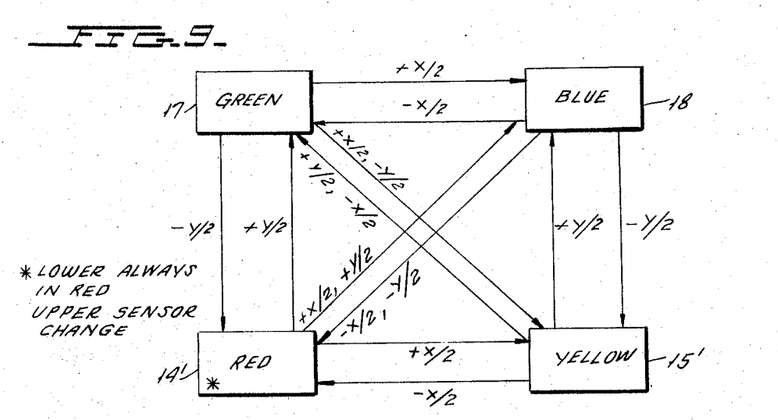
FIGURES 9–11 are diagrams provided to explain the operation of the circuitry of FIGURES 4a–4c.

If the lower sensor is assumed to remain in the red box and only the upper sensor changes, it can go to either the green, blue or yellow boxes as shown in FIGURE 9. Crossing from red to green will generate a change of $+Y/2$ while returning from green to red generates the inverse of this signal or $-Y/2$. With this motion, moving the upper sensor into a green box and then returning to the red box effectively causes no change in position which is the desired result.

All of the numeric and directive ($\pm X/2$) weights assigned to each transition are adjusted so that any combination of sector crossings made with an eventual return of the upper sensor to the red position 141 (lower sensor always in red) generates a total change of zero.

Figure 10:
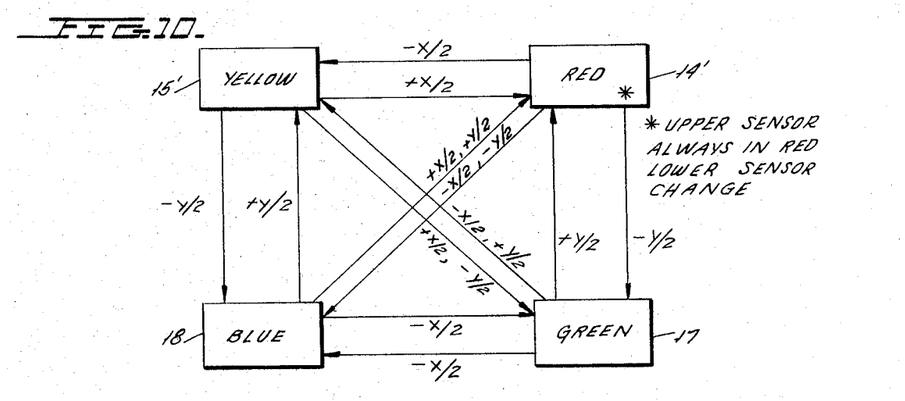

FIGURE 10 describes the resulting weights if the upper sensor is held fixed within the confines of the red box and if the lower sensor is moved through any of the neighboring sectors. A similar analysis holds for these conditions. It should be noted that the diagonal positioning of the sensors coupled in turn with the restriction prohibiting the rotation of the imaginary resulting diagonal previously described prevents any other combinations of single sensor crossings than those shown in FIGURES 9 and 10.

Figure 11:
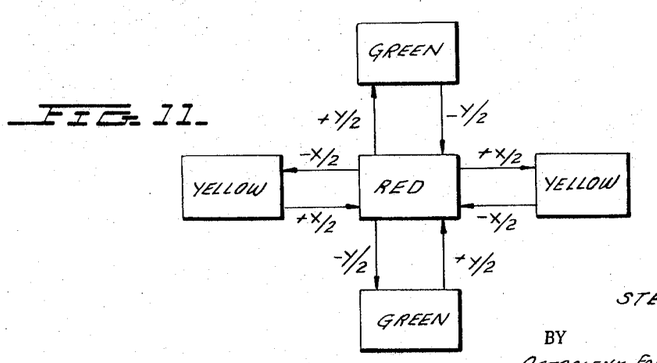

The final possible motion is that of a diagonal up and to the left or down and to the right which causes both sensors to change state simultaneously. FIGURE 11 shows the resulting weights necessary for this condition.

Logical implementation of these different possible changes requires detecting whether one sensor changed uniquely, determining which one it was and handling the conditions that exist if they both changed simultaneously.

To correctly handle all the possible position combinations, it is necessary to know the previous state (color of the square it resided in) of each sensor and the new state (color of the square it now resides in) of each. In addition, the particular sensor which changed ("upper only," "lower only" or "both simultaneously") must be known to make a decision.

Four flip-flops (to be more fully described) are assigned one for each color to indicate the previous state of the upper sensor. In addition, four more flip-flops (to be more fully described) are also assigned for the new states of the upper sensor. Similarly a total of eight more flip-flops are assigned for the lower sensor.

Figure 12:
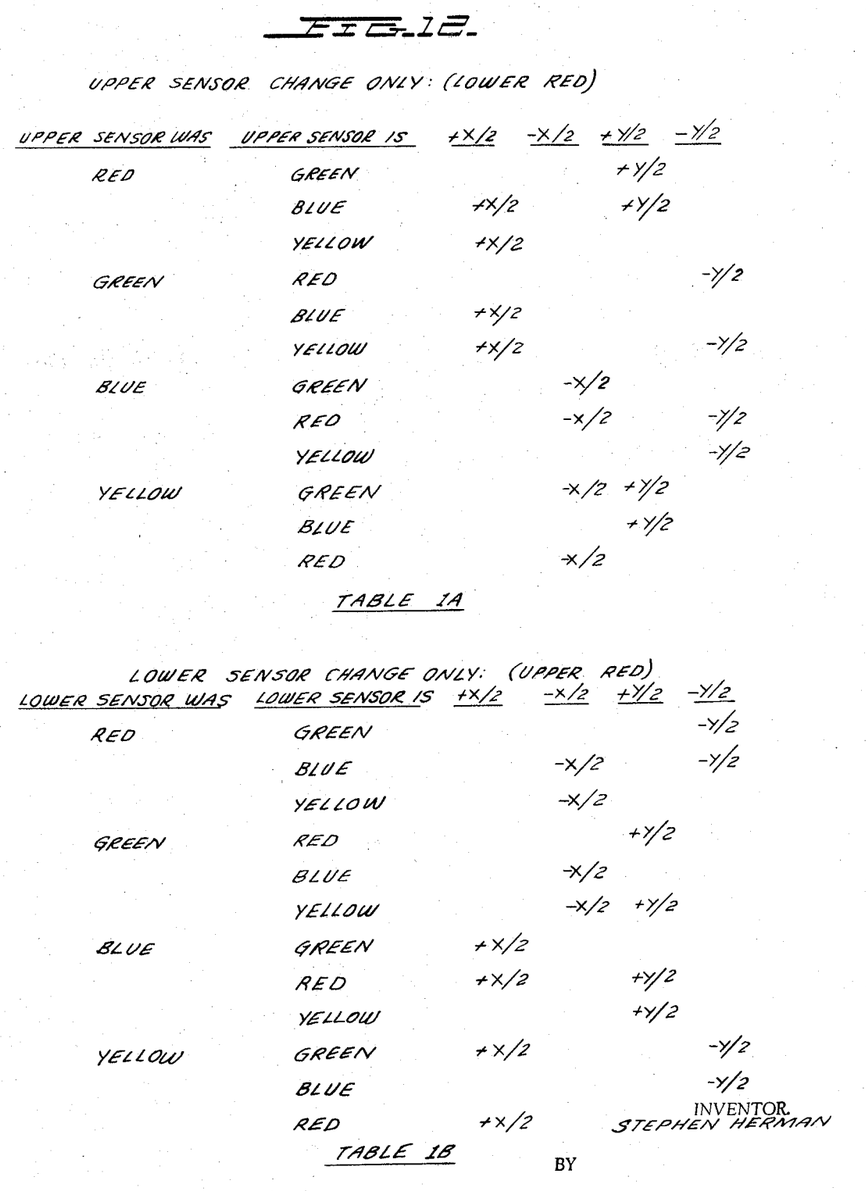
FIGURES 12 shows two tables describing the types of movement depicted in the diagrams of FIGURES 9–11.

Table 1A of FIGURE 12 contains all the possible moves associated with a change in state for the upper sensor 31. All of these are based on the two sensors originally existing in the red sector and plotting the motions of the upper with the lower still in red.

Table 1B of FIGURE 12 contains all of the possible moves associated with a change in state for the lower sensor 32, with the upper remaining in the red sector.

Assuming the lower sensor 32 to remain in one sector, the upper sensor is free to move in any of three adjacent sectors. There are twelve (12) possible separate moves available to the upper unit. Keeping the upper sensor fixed in the same reference sector as previously used twelve (12) moves are available to the lower sensor. In addition, four (4) possible diagonal moves exist where both sensors change state simultaneously. Therefore, from any reference sector, twenty-eight (28) possible combinations of moves exist. Since there are four (4) basic colors (separate sectors) a total of (28 x 4) or one hundred and twelve (112) possible variations exist for the two diagonal sensors and the four basic color matrix.

Figure 4A:
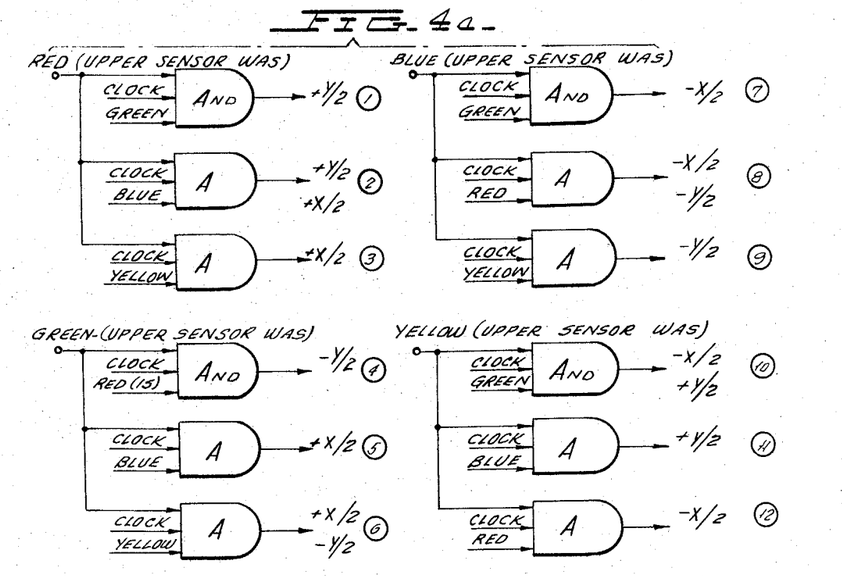
FIGURES 4a–4c are logical diagrams showing the gating or logic circuitry of FIGURE 3 in greater detail, which circuitry is employed to detect horizontal and vertical motion and up-down and left-right motion.

Now a brief description of the logic necessary to implement the various combinations of Tables 1A and 1B will be given. FIGURE 4a contains logic necessary to handle the conditions of Table 1A and FIGURE 4b handles Table 1B.

Each element shown in FIGURE 4a is a three element "and" gate. Since the lower sensor does not move (always in red box for this condition), the inputs to the gate refer only to the upper sensor 31. One input to each AND gate is the last color associated with the upper sensor. This signal is derived from one of the four flip-flops assigned to indicate the previous sector color. The second input is the new sector color that the sensor resides in. This is derived from one of the second group of memory flip-flops associated with the existing color of the sensor. The third input is the gating pulse generated when the upper sensor changes state. Each possible combination of colors is shown and the output designated for each gate indicates the unit weight associated with each condition.

Figure 4B:
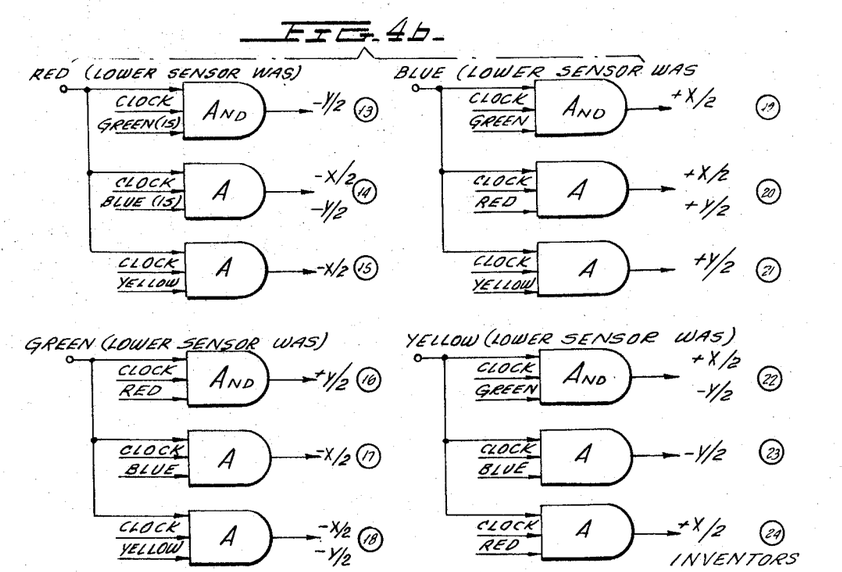

Attached to each output in FIGURE 4a is an identifying number and the prescribed weighting unit. Since FIGURE 4a is the implementation of the upper sensor moving with the lower sensor fixed, it only covers half the possible combinations of one sensor changing. FIGURE 4b indicates the remainder of the conditions associated with one sensor moving at a time. However, the resulting logic is only applicable for one initial condition that is both sensors in the red sector. To allow the logic to handle all four initial conditions (four basic colors) this logic must be reproduced four separate times.

Diagonal motion causing both sensors to change simultaneously can be handled by the principle of superposition. Crossing of the upper sensor to the sector vertically above its initial sector should generate a $+Y/2$ and moving its lower sensor to the box horizontally displaced to the left requires a change of $-X/2$ at the same time.

Assume both sensors initially to exist in the yellow sector for purposes of explanation and traverse a diagonal motion up and to the left such that the lower sector moves to the red and the upper to the blue. Both signals, "upper change only" and "lower change only" will be activated. If the "upper change only" pulse is allowed through the system, it will appear to the logic that the lower is in red and has not changed. Therefore, the logic for lower always in red will apply. However, the upper will appear to have gone from yellow to blue. This will generate a $+Y/2$ change as shown by output number 12 in FIGURE 4a which is the desired result. A similar investigation of the effect of the lower change will indicate that the required conditions are generated without the necessity of additional logic.

Figure 4C:
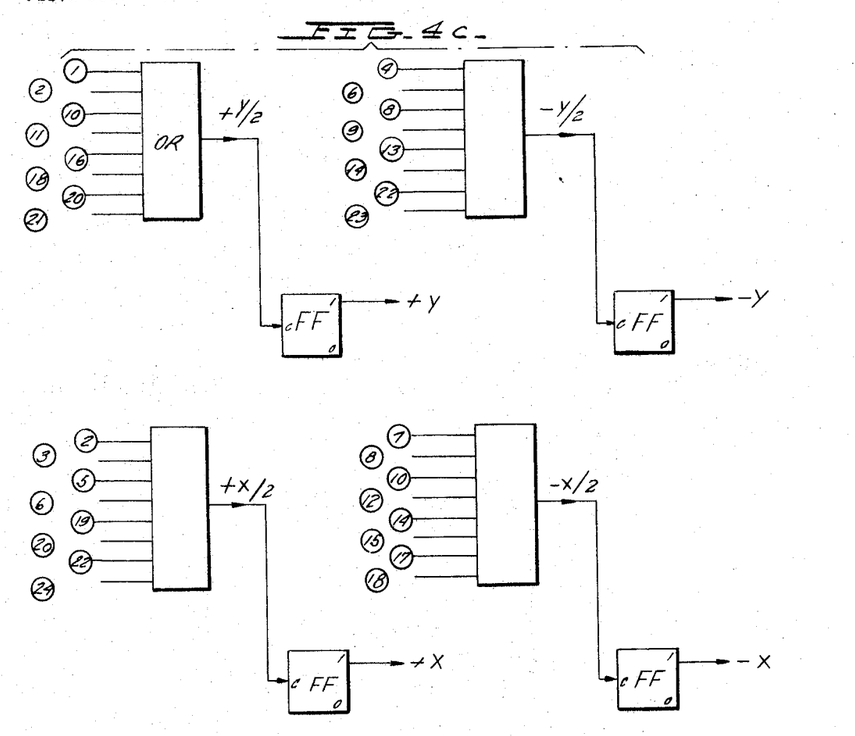

FIGURE 4c indicates the "or" circuits needed to sum all the possible input combinations of this one section of the logic. Complementing flip-flops are shown to count two half changes in either X or Y before a pulse is transmitted to the required counter chain. A reversible counter is required to allow adding or subtracting a pulse in either the X or Y axis without having to go through a full adder each time.

Any time that a readout is desired, the operator need merely depress the readout button 44 of FIGURE 3 so as to readout the X and Y coordinates at the output terminals 58 and 59 through the readout gate circuitry 55.

Present state of the art resolution limitations on the instant system is about five mils when used with tracing paper over the checkerboard pattern as suggested above. This compares quite favorably with present analog plotters where the resolution limit is about 30 mils. If, however, the tracing paper were not used, then the two optical sensors are used to detect and calibrate motion as would be done in industrial control applications. The state of the art imposes a resolution limit of about 0.4 mil which is comparable to the resolutions of some of the best position controlled machinery available today. The 0.4 mil resolution limit is posed by the photographic process by which it is proposed that the checkerboard pattern be reproduced. With the employment of better etching techniques, the resolution limit can be made to be much smaller than 0.4 mil.

The instant invention applied as a plotter is a simple, economical and precise way of reading hand and machine-drawn curves into a computer or data display system. Since the coordinates of the plot have to be read-in, while the curve is being traced-out, a buffer storage could be connected to the outputs of the gate circuitry 55 of FIGURE 3 until the computer or data display system is ready to process the coordinate information.

To express the resolution of the instant invention in binary bits, let it be assumed that the plotting surface is 30″ x 30″. With a resolution of 5 mils, this would be one part in 6000. This is equivalent to better than twelve binary bits compared to one part in 1000, or less than ten binary bits for existing plotters.

With reference to computers, the instant invention has an application to the field of character recognition, with hand-written characters being encoded so that a computer can interpret and manipulate them through the digital coordinate information. For data display systems, the instant invention can be used as a conventional coordinate supplying read-in unit.

The plotting board and recording instrument is also ideally suited for the curve tracing technique published recently entitled "On Encoding Arbitrary Geometric Configurations," by Herbert Freeman, which appears in the I.R.E. transactions on electronic computers June 1961, pages 260–268. The article proposes that instead of recording the full coordinates of every plotted points, which may require twenty binary bits or more, the same job can be performed with only three binary bits per point. To do this the operation starts from a known point such as the center box of the figure, as shown by the small portion of the plotting board 11 in FIGURE 1a. With the plotting pen 30 in the position as shown in FIGURE 1a, there are only eight possible squares to which the plotting instrument can move. Each of these squares 0–7 are encoded digitally, as shown in FIGURE 1a, with the binary coded representation of each decimal number being shown in FIGURE 1a in brackets and being immediately above each of the decimal numbers. For example, the number 2 is represented by the binary code 010; the number 5 is represented by the binary code 101 and so forth. Three binary bits are sufficient to express all decimal numbers from 0–7, or a total of eight possible combinations. Hence, starting from a known point, one can define the next point through which the plotting instrument 30 moves by means of a three binary bit code. Movement from the second point to a third point occurs in the same way until the entire curve is displayed in this manner.

It is suggested that for some data display systems the plotter of the instant invention may be modified to take advantage of the technique outlined above. The modification eliminates the $x$ and $y$ coordinate counters and feeds the data display system a sequence of words having a length of four binary bits. Three binary bits locate the next point as just discussed and the fourth binary bit indicates whether or not a curve is located at that particular location. That is, three binary bits are used to follow the track or position, which is a continuous curve and the fourth binary bit indicates if the pen is activated or not. In this manner, complex data displays can be stored with minimum storage capacity.

A wide variety of industrial applications may be benefited by the use of the instant invention and above techniques. Indeed relative motion between any two machine parts can be measured very precisely using the two light detector sub-assembly arrangements without the pen and without the tracing paper. This technique is particularly useful in computer controlled automation systems where two-dimensional motion is involved. Where only one-dimensional motion is involved, the proposed system simplifies enormously.

An alternative embodiment to that described above will now be considered with respect to the FIGURES 5-8. This alternative embodiment employs the same principles as that described above, but is greatly simplified in that it does not require a colored checkerboard type pattern for its implementation and operation. The alternative embodiment is comprised of a plotting board surface 100 formed of an opaque material and having a matrix 101 comprised of equally spaced horizontal and vertical lines 102 and 103 respectively. The lines 102 and 103 forming the matrix are scribed on the plotting surface 100 in such a manner as to permit the passage of light therethrough (it being understood that a suitable light source be positioned beneath the plotting surface 100 in a manner similar to that previously described).

The key factors in this alternative embodiment are the optical sensors and the pattern which they are looking at. Thus the plotting is done over the pattern of FIGURE 5 which looks substantially like graph paper in that it consists of transparent lines etched on an opaque background. With the suitable light source placed there beneath the pattern simply looks like lines of light crossing in a square graph paper manner.

Figures 5, 7, 8:
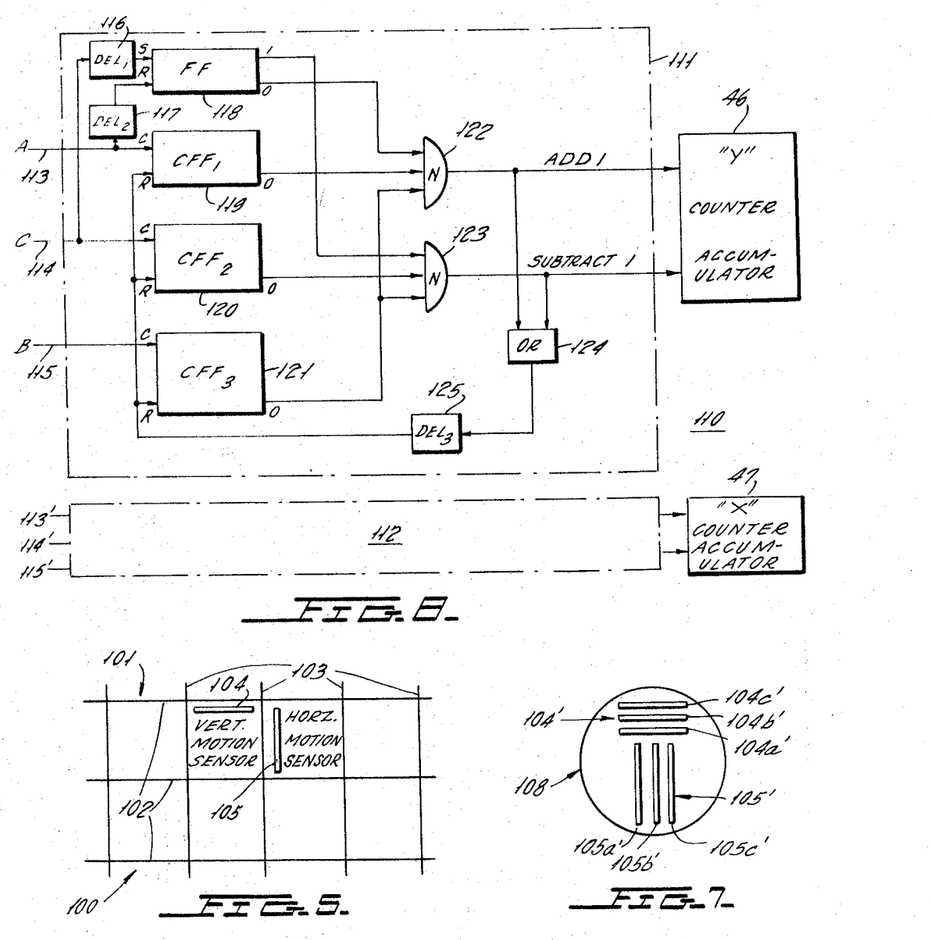
FIGURES 5 and 6 show plotting boards of an alternative embodiment of the instant invention.
FIGURE 7 shows the light detection means employed with the plotting boards of FIGURES 5 and 6.
FIGURE 8 shows the logical circuitry employed with the plotting boards of FIGURES 5 and 6 and the plotting instrument of FIGURE 7 respectively, for use in detecting horizontal and vertical motion, as well as up-down and left-right motion.

The optical sensors are narrow, elongated means 104 and 105 which detect crossings over the illuminated lines with the sensor 104 being the vertical motion sensor and sensor 105 being the horizontal motion sensor. These sensors may be considered to be long, narrow slits cut into some suitable opaque material with light collecting lenses and a light sensor behind each of the vertical and horizontal sensing means.

Consider first the vertical motion sensor 104. As it moves either vertically upward or downward, the light passing through its slit will be high relative to the light passing through the same slit were it to move in a horizontal direction and pass over a vertical light line 103. The horizontal motion sensor 105 is analogously able to differentiate between horizontal and vertical line crossings in such a manner that it provides a peak output only for vertical line crossings.

This arrangement decomposes all plotting motion into its absolute $x$ and $y$ components with the remaining task being that of defining the motion as being in the positive or negative direction along each component. To provide this differentiation each of the vertical and horizontal sensing means 104 and 105 are comprised of three independent slits 104a–104c and 105a–105c respectively, each with its own independent light detection means. This arrangement is clearly shown in FIGURE 6. The usage of sets of three slit sensor pairs greatly simplifies the electronic requirements in this alternative embodiment as will clearly be seen.

The construction of three slits and optical sensors for each of said slits for discrimination of horizontal motion from vertical is difficult and unnecessary. The same effect can be achieved by building a small semi-conductor light cell 108, as shown in FIGURE 7, which is provided with long, narrow rectangular strips of light-sensitive material 104a′–104c′ and 105a′–105c′, which strips are arranged on the light cell 108 in the manner shown. In this manner, all six sensors can be contained within a substantially small sized package.

The illuminated lines forming the plotting board matrix can now be imaged directly on the plane of the semi-conductor strips and the two sets of mutually perpendicular light sensor strips 104′ and 105′ respectively, and decompose all motion into the $x$ and $y$ components which can then be employed to control the $x$ and $y$ coordinate counters.

It should be understood that the light detector cell 108 of FIGURE 7 can be suitably mounted into the housing 33 of FIGURE 2, or housing similar thereto, which housing is then suitably mounted to a pantograph assembly, such as the assembly 19 of FIGURE 1, for the purpose of maintaining the angular orientation of the light sensor strips relative to the matrix, as well as maintaining the recording instrument substantially perpendicular to the plotting board surface.

Figure 6:
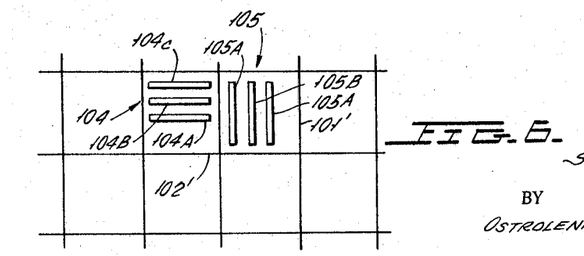

The electronic circuitry employed in the alternative embodiment of FIGURES 5-7 is substantially identical to that of FIGURE 3, with the exception of the logic circuitry of FIGURE 4, which is replaced by the electronic circuitry 110 of FIGURE 8 of the drawing. The electronic circuitry 110 is comprised of $x$ coordinate and $y$ coordinate logic circuits 111 and 112 respectively. Only the $y$ coordinate logic 111 is being shown in detail, it being understood that the $x$ coordinate circuitry 112 is substantially identical in both design and function. The $y$ coordinate logical circuitry 111 is comprised of three input terminals 113–115 for receiving the A, C and B signals respectively, of the horizontal motion detection center assembly 105′. The circuit is further comprised of a flip-flop 118, which is so designed that when it receives a trigger at its set input terminal, its "one" output terminal goes high and its "zero" output terminal goes low. When it receives a trigger at its reset terminal its "zero" output terminal goes high and its "one" output terminal goes low. Three complementary flip-flop circuits 119 and 121 are provided and operate such that when a trigger is impressed upon its reset input terminal, its "zero" output terminal goes high and when a trigger is impressed upon its complementary input terminal the complementary flip-flop circuit reverses its state regardless of the previous state of the flip-flop. Selected outputs of the flip-flop 118 and the complementary flip-flops 119–121 are connected to input terminals of the NOR gates 122 and 123 which operate in such a manner that when all of its input terminals are low its output terminal goes high. The outputs of the NOR gates 122 and 123 are simultaneously impressed upon the add and subtract inputs of the $x$ coordinate counter 46 and the inputs of OR gate 124, the output of which is connected through a delay means 125 for the purpose of resetting complementary flip-flops 119–121.

Let it now be considered that the plotting instrument is in the position as shown in FIGURE 6 and that the instrument will now move vertically downward. The following chart fully describes the operation of the logical circuitry 111:

| C<br>E B<br>A<br>going down | FF<br>"1" | FF<br>"0" | CFF₁<br>"0" | CFF₂<br>"0" | CFF₃<br>"0" | NOR<br>122 | NOR<br>123 |
|---|---|---|---|---|---|---|---|
| 1. Nothing crossing line | high | low | high | high | high | low | low |
| 2. A crosses line | high | low | low | high | high | low | low |
| 2a. Delay 2 action | low | high | low | high | high | low | low |
| 3. B crosses line | low | high | low | low | high | low | low |
| 4. C crosses line | low | high | low | low | low | low | high |
| 4a. Delay D₃ resets CFF₁; CFF₂, CFF₃ and Delay D₁ sets FF | high | low | high | high | high | low | low |

To describe the action in more detail than the chart above, the following description is offered:

With the motion detection sensor shown in the position of FIGURE 6, and with no motion whatsoever taking place at that given instant, this condition constitutes step 1 of the chart above. In this position the flip-flop 118 has its "one" output high and its "zero" output low. The "zero" outputs of complementary flip-flops 119–121 are all in the high state, having been reset from the last previous operation and also not having received any signals at the input terminals 113–115. This causes both NOR gates 122 and 123 to be low at their output terminals.

| going up | FF | | CFF$_1$ | CFF$_2$ "0" | CFF$_3$ "0" | NOR 16 | NOR 17 |
|---|---|---|---|---|---|---|---|
|  | "1" | "0" | "0" "0" |  |  |  |  |
| 1. C crosses line | high | low | high | low | high | low | low |
| 1a. Delay D$_1$ sets FF | high | low | high | low | high | low | low |
| 2. C re-crosses line | high | low | high | high | high | low | low |

Assuming the motion now to be vertically downward, the first detection sensor to cross the line 102' of FIGURE 6 is the sensor 104a. This causes an A signal to be impressed upon the complementary input of complementary flip-flop 119, causing its "zero" output terminal to go low. After a slight delay imposed by the delay means 117 the A signal is impressed upon the reset input terminal of flip-flop 118 causing its "zero" output terminal to go high and its "one" output terminal to go low. This corresponds to step 2a of the chart immediately above. As the plotting instrument continues to move vertically downward, the next motion detecting sensor to cross line 102' is sensor 104b. This causes a signal to be impressed upon the complementary input of complementary flip-flop 121 through input terminal 115, causing its "zero" output terminal to go low. Immediately thereafter, motion detector sensor 104c crosses horizontal line 102' causing a C signal to be impressed upon input terminal 114 which is in turn impressed upon the complementary input terminal of complementary flip-flop 120. This causes its "zero" output terminal to go low. At this instant of time NOR gate 123 has a low signal from complementary flip-flop 121, a low signal from complementary flip-flop 120 and low signal from flip-flop 118, causing its output terminal to go high. This impresses a subtract one upon the input terminal of $y$ coordinate counter 46. This corresponds to step 4 of the chart above.

The output of NOR gate 123 also passes through OR gate 124 which after a delay imposed by the delay means 125 causes complementary flip-flops 119–121 to be reset. A third delay means 116 impresses the C signal upon the set input terminal of flip-flop 118 causing its "one" output terminal to go high and its "zero" output terminal to go low, thus placing the circuitry in readiness for the next operation.

In the case where the vertical motion sensors housed within the plotting instrument are moved vertically upward, the condition of the electronic circuits in the logical circuitry arrangement 111 are shown in the chart below:

| Action going up | FF | | CFF$_1$ | CFF$_2$ | CFF$_3$ | NOR 122 | NOR 123 |
|---|---|---|---|---|---|---|---|
|  | "1" | "0" |  |  |  |  |  |
| 1. C crosses line | high | low | high | low | high | low | low |
| 1a. Delay D, sets FF | high | low | high | low | high | low | low |
| 2. B crosses line going down | high | low | high | low | low | low | low |
| 3. B re-crosses line | high | low | high | low | high | low | low |
| 4. C re-crosses line | high | low | high | high | high | low | low |

Hence the counters are not activated. Now assume reversal after both B and C crossed line, starting upward:

| Action upward | FF | | CFF$_1$ "0" | CFF$_2$ "0" | CFF$_3$ "0" | NOR 122 | NOR 123 |
|---|---|---|---|---|---|---|---|
|  | "1" | "0" |  |  |  |  |  |
| 1. C crosses line | high | low | high | low | high | low | low |
| 1a. Delay sets FF | high | low | high | low | high | low | low |
| 2. B crosses line | high | low | high | low | low | low | low |
| 3. A goes on line then pen is reversed | high | low | low | low | low | high | low |
| 4. Delay D$_3$ resets CFF$_1$, CFF$_2$, CFF$_3$, D$_2$ resets FF | low | high | high | high | high | low | low |
| 5. B re-crosses line | low | high | high | high | low | low | low |
| 6. C re-crosses line | low | high | high | low | low | low | high |
| 7. Delay D$_3$ resets CFF$_1$, CFF$_2$, CFF$_3$, D$_1$ sets FF | high | low | high | high | high | low | low |

Again the circuit is reset and no count was changed. Finally, assume that, going up B and C crossed and reversal occurs when A "sees" the line. Now machine reacts as if it really crossed completely, but then corrects itself. See steps 3 and 6 below:

Whereas the alternative embodiment of FIGURES 5–8 performs basically the same function as the embodiment of FIGURES 1–4, the major advantage of the latter embodiment is its greater simplicity. The new plotting board pattern is much simpler, as is the electronics and the optical sensors. This results in a simpler system having higher reliability and lower productions costs.

It can therefore be seen that instant invention provides an automatic data plotting system which may be either manually or automatically operated and which simultaneously generates digital information representative of the $x$ and $y$ coordinates of a point of a plot being traced upon the data plotter system plotting board. This system has a high degree of simplicity thus giving it good reliability and providing digital information simultaneously with the trace of the plot with as few, or as many, coordinate outputs as is desired by the user.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. Data plotting means comprising a plotting surface having a plurality of substantially equal sized squares forming a checkerboard pattern; selected ones of said squares being formed of translucent material of at least two different colors; a light source positioned beneath said surface; detection means movable over said surface for generating first signals representative of the squares passing beneath said detection means.

2. Data plotting means comprising a plotting surface having a plurality of substantially equal sized squares forming a checkerboard pattern; selected ones of said squares being formed of translucent material of at least two different colors; a light source positioned beneath said surface; detection means movable over said surface for generating first signals representative of the squares passing beneath said detection means; logical circuit means for receiving said first signals to generate second signals indicative of the motion experienced by said motion detection means.

3. Data plotting means comprising a plotting surface having a plurality of substantially equal sized squares forming a checkerboard pattern; selected ones of said squares being formed of translucent material of at least two different colors; a light source positioned beneath said surface; detection means movable over said surface for generating first signals representative of the squares passing beneath said detection means; logical circuit means for receiving said first signals to generate second signals indicative of the motion experienced by said motion detection means; first reversible counting means for receiving said second signals to generate a count representative of one coordinate of the motion detection means location at any given instant of time.

4. The device as set forth in claim 3 which includes second reversible mounting means for receiving second signals to generate a count representative of the other coordinate of the motion detection means location at any given instant of time.

5. The device as set forth in claim 4 which includes gating means for reading out the counts in said counters at any given instant to a suitable utilization device.

6. Data plotting means comprising a plotting surface having a plurality of substantially equal sized squares forming a checkerboard pattern; selected ones of said squares being formed of translucent material of at least two different colors; a light source positioned beneath said surface; detection means movable over said surface for generating first signals representative of the squares passing beneath said detection means; said detection means comprising first and second optical sensing assemblies positioned at spaced intervals a distance less than the width of each square; each of said assemblies comprising beam splitting means for splitting a beam into two directions; two light detection means each placed in one of the two split light paths.

7. Data plotting means comprising a plotting surface having a plurality of subtsantially equal sized squares forming a checkerboard pattern; selected ones of said squares being formed of translucent material of at least two different colors; a light source positioned beneath said surface; detection means movable over said surface for generating first signals representative of the squares passing beneath said detection means; said detection means comprising first and second optical sensing assemblies positioned at spaced intervals a distance less than the width of each square; each of said assemblies comprising beam splitting means for splitting a beam into two directions; two light detection means each placed in one of the two split light paths; each of said light detection means being sensitive to a different color.

8. Data plotting means comprising a plotting surface having a plurality of substantially equal sized squares forming a checkerboard pattern; selected ones of said squares being formed of translucent material of at least four different colors; a light source positioned beneath said surface; detection means movable over said surface for generating first signals representative of the squares passing beneath said detection means.

9. Data plotting means comprising a plotting surface having a plurality of substantially equal sized squares forming a checkerboard pattern; selected ones of said squares being formed of translucent material of at least four different colors; a light source positioned beneath said surface; detection means movable over said surface for generating first signals representative of the squares passing beneath said detection means; logical circuit means for receiving said first signals to generate second signals indicative of the motion experienced by said motion detection means.

10. Data plotting means comprising a plotting surface having a plurality of substantially equal sized squares forming a checkerboard pattern; selected ones of said squares being formed of translucent material of at least four different colors; a light source positioned beneath said surface; detection means movable over said surface for generating first signals representative of the squares passing beneath said detection means; logical circuit means for receiving said first signals to generate second signals indicative of the motion experienced by said motion detection means; first reversible counting means for receiving said second signals to generate a count representative of one coordinate of the motion detection means location at any given instant of time.

11. The device as set forth in claim 10 which includes second reversible counting means for receiving said second signals to generate a count representative of the other coordinate of the motion detection means location at any given instant of time.

12. The device as set forth in claim 11 which includes gating means for reading out the counts in said counters at any given instant to a suitable utilization device.

13. Data plotting means comprising a plotting surface having a plurality of substantially equal sized squares forming a checkerboard pattern; selected ones of said squares being formed of translucent material of at least four different colors; a light source positioned beneath said surface; detection means movable over said surface for generating first signals representative of the squares passing beneath said detection means; said detection means comprising first and second optical sensing assemblies positioned at spaced intervals a distance less than the width of each square; each of said assemblies comprising beam splitting means for splitting a beam into four directions; four light detection means each placed in one of the two split light paths.

14. Data plotting means comprising a plotting surface having a plurality of substantially equal sized squares forming a checkerboard pattern; selected ones of said squares being formed of translucent material of at least four different colors; a light source positioned beneath said surface; detection means movable over said surface for generating first signals representative of the squares passing beneath said detection means; said detection means comprising first and second optical sensing assemblies positioned at spaced intervals a distance less than the width of each square; each of said assemblies comprising beam splitting means for splitting a beam into four directions; four light detection means each placed in one of the two split light paths; each of said light detection means being sensitive to a different color.

15. Data plotting means comprising a plotting surface of substantially opaque material having a regular matrix of equally spaced horizontal and vertical lines permitting light to pass therethrough; a light source positioned beneath said plotting surface; detection means movable across said surface for generating first signals representative of the lines passing beneath said detection means.

16. Data plotting means comprising a plotting surface of substantially opaque material having a regular matrix of equally spaced horizontal and vertical lines permitting light to pass therethrough; a light source positioned beneath said plotting surface; detection means movable across said surface for generating first signals representative of the lines passing beneath said detection means; logical circuit means for receiving said first signals to generate second signals indicative of the motion experienced by said motion detection means.

17. The device as set forth in claim 16 which includes second reversible counting means for receiving said second signals to generate a count representative of the other coordinate of the motion detection means location at any given instant of time.

18. Data plotting means comprising a plotting surface of substantially opaque material having a regular matrix of equally spaced horizontal and vertical lines permitting light to pass therethrough; a light source positioned beneath said plotting surface; detection means movable across said surface for generating first signals representative of the lines passing beneath said detection means; logical circuit means for receiving said first signals to generate second signals indicative of the motion experienced by said motion detection means; first reversible counting means for receiving said second signals to generate a count representative of one coordinate of the motion detection means location at any given instant of time.

19. Data plotting means comprising a plotting surface of substantially opaque material having a regular matrix of equally spaced horizontal and vertical lines permitting light to pass therethrough; a light source positioned beneath said plotting surface; detection means movable across said surface for generating first signals representative of the lines passing beneath said detection means; logical circuit means for receiving said first signals to generate second signals indicative of the motion experienced by said motion detectiton means; first reversible counting means for receiving said second signals to generate a count representative of one coordinate of the motion detection means location at any given instant of time; gating means for reading out the counts in said counters at any given instant to a suitable utilization device.

20. Data plotting means comprising a plotting surface of substantially opaque material having a regular matrix of equally spaced horizontal and vertical lines permitting light to pass therethrough; a light source positioned beneath said plotting surface; detection means movable across said surface for generating first signals representative of the lines passing beneath said detection means; said detection means comprising first and second long narrow light sensitive strips, said first strip being parallel to said horizontal lines.

21. Data plotting means comprising a plotting surface of substantially opaque material having a regular matrix of equally spaced horizontal and vertical lines permitting light to pass therethrough; a light source positioned beneath said plotting surface; detection means movable across said surface for generating first signals representative of the lines passing beneath said detection means; said detection means comprising first and second long narrow light sensitive strips, said first strip being parallel to said horizontal lines; and said second strip being parallel to said vertical lines.

22. Data plotting means comprising a plotting surface of substantially opaque material having a regular matrix of equally spaced horizontal and vertical lines permitting light to pass therethrough; a light source positioned beneath said plotting surface; detection means movable across said surface for generating first signals representative of the lines passing beneath said detection means; said detection means comprising horizontal and vertical motion sensors; both said horizontal and vertical motion sensors being comprised of three long narrow light sensitive strips arranged at spaced parallel intervals; said horizontal motion sensor strips being parallel to said vertical lines and the vertical motion sensor strips being parallel to said horizontal lines.

23. Data plotting means comprising a plotting surface of substantially opaque material having a regular matrix of equally spaced horizontal and vertical lines permitting light to pass therethrough; a light source positioned beneath said plotting surface; detection means movable across said surface for generating first signals representative of the lines passing beneath said detection means; said detection means comprising horizontal and vertical motion sensors; both said horizontal and vertical motion sensors being comprised of three long narrow light sensitive strips arranged at spaced parallel intervals; said horizontal motion sensor strips being parallel to said vertical lines and the vertical motion sensor strips being parallel to said horizontal lines; logical circuit means for receiving said first signals to generate second signals indicative of the motion experienced by said motion detection means.

24. Data plotting means comprising a plotting surface of substantially opaque material having a regular matrix of equally spaced horizontal and vertical lines permitting light to pass therethrough; a light source positioned beneath said plotting surface; detection means movable across said surface for generating first signals representative of the lines passing beneath said detection means; said detection means comprising horizontal and vertical motion sensors; both said horizontal and vertical motion sensors being comprised of three long narrow light sensitive strips arranged at spaced parallel intervals; said horizontal motion sensor strips being parallel to said vertical lines and the vertical motion sensor strips being parallel to said horizontal lines; logical circuit means for receiving said first signals to generate second signals indicative of the motion experienced by said motion detection means; first reversible counting means for receiving said second signals to generate a count representative of one coordinate of the motion detection means location at any given instant of time.

25. The device as set forth in claim 24 which includes second reversible counting means for receiving said second signals to generate a count representative of the other coordinate of the motion detection means location at any given instant of time.

26. The device as set forth in claim 25 which includes gating means for reading out the counts in said counters at any given instant to a suitable utilization device.

References Cited by the Examiner
UNITED STATES PATENTS

| | | | |
|---|---|---|---|
| 3,024,986 | 3/1962 | Strianese et al. | 235—92 |
| 3,099,831 | 7/1963 | Jones | 340—347 |

MAYNARD R. WILBUR, *Primary Examiner.*

A. L. NEWMAN, *Assistant Examiner.*